Patented Apr. 19, 1949

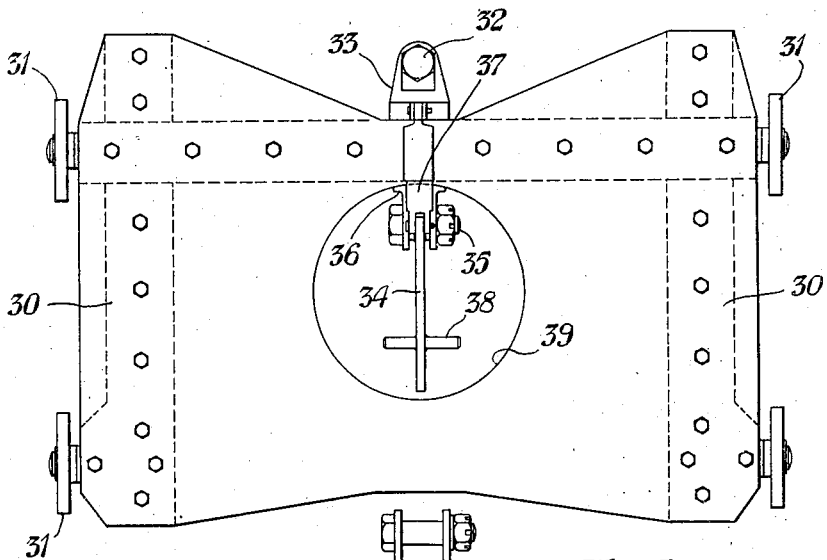
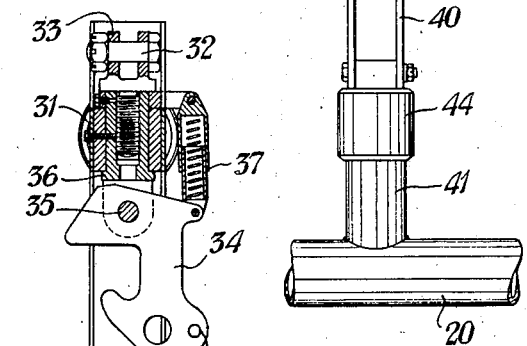
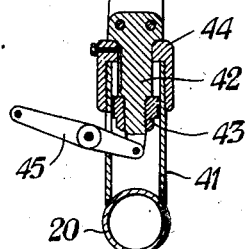

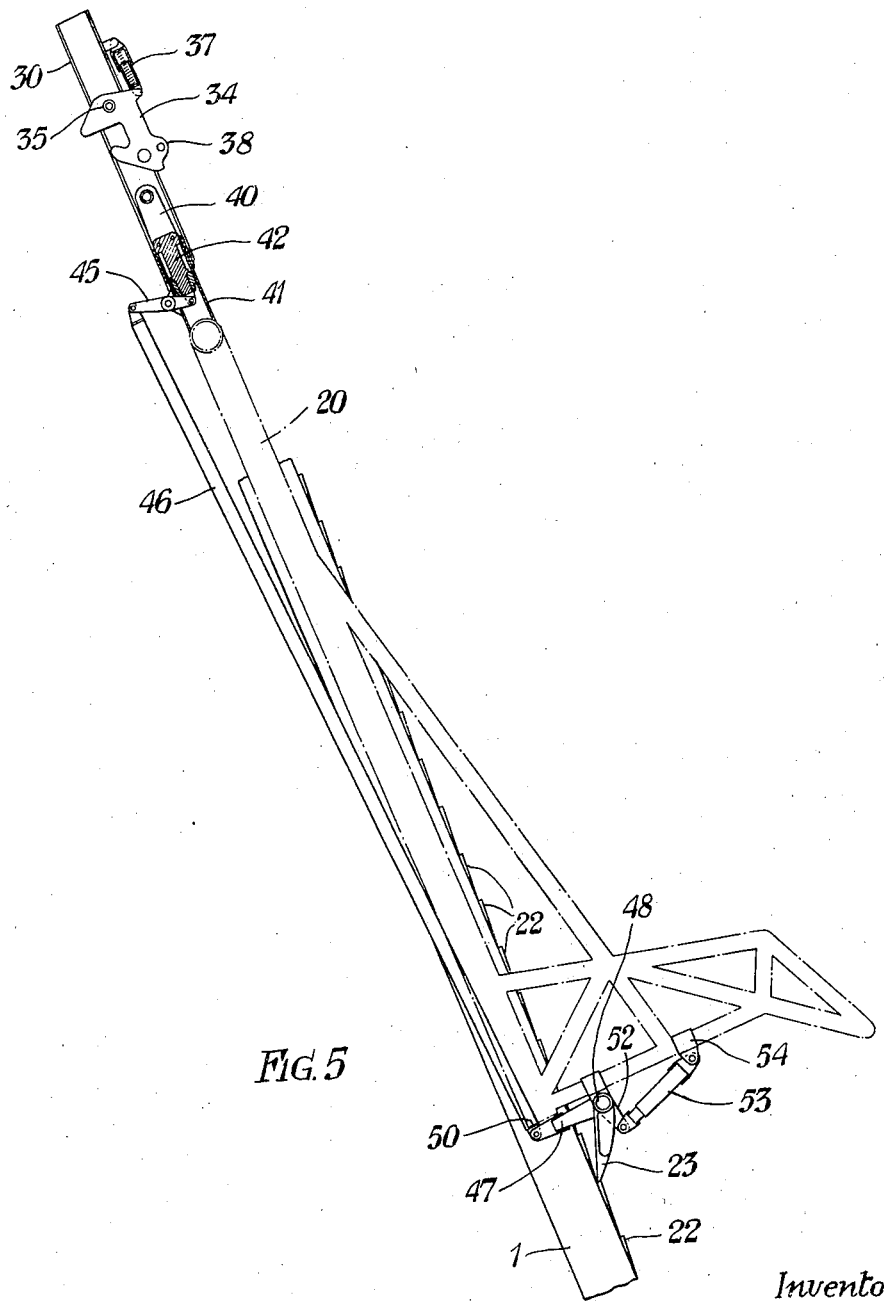

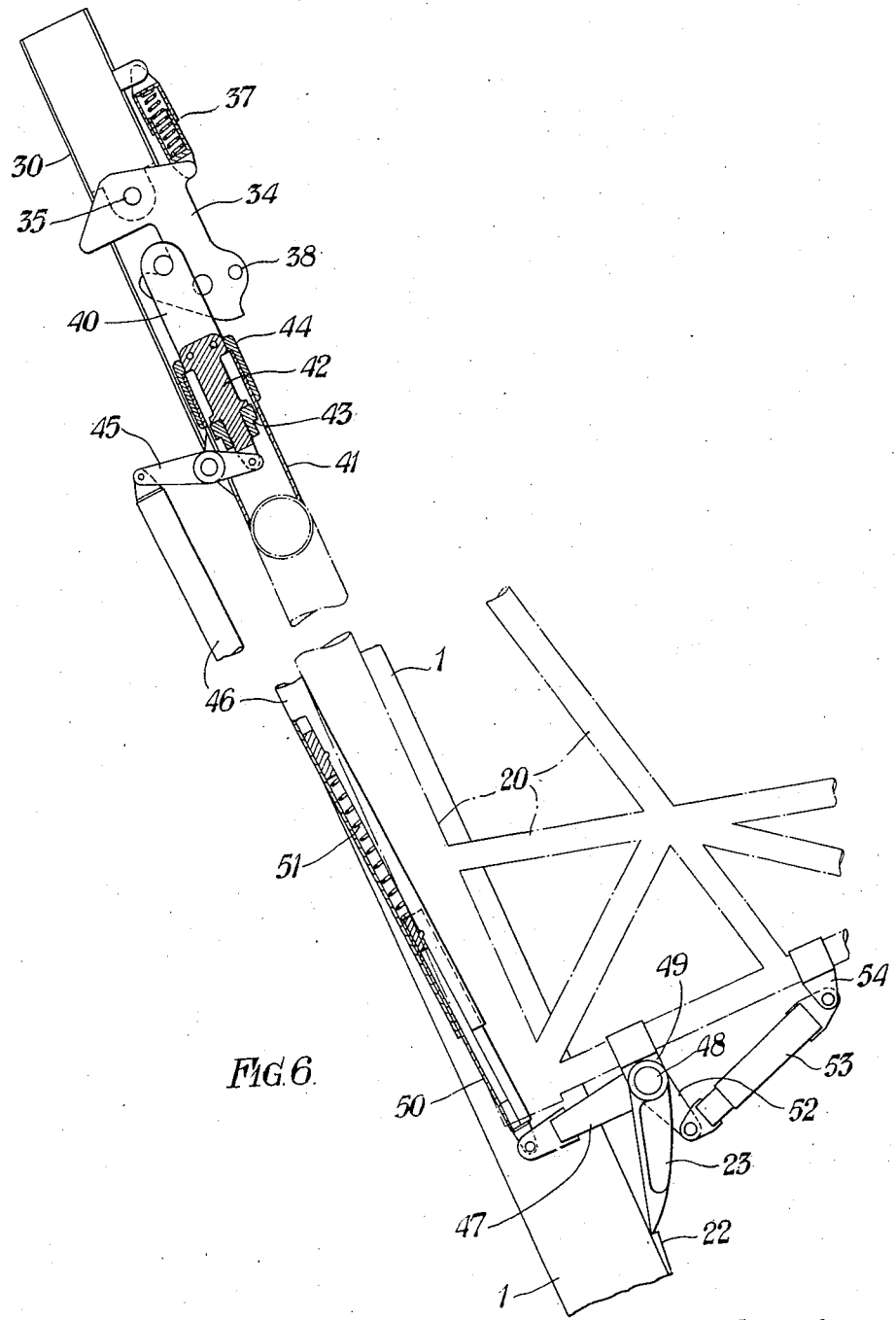

2,467,764

UNITED STATES PATENT OFFICE 2,467,764

APPARATUS FOR TESTING ON THE GROUND EJECTION SEATS INTENDED FOR USE IN AIRCRAFT

James Martin, Higher Denham, near Uxbridge, England

Application April 9, 1946, Serial No. 660,816
In Great Britain February 18, 1946

5 Claims. (Cl. 35—10)

1

The invention relates to the testing or making of practical trials in connection with the launching of personnel from aircraft in flight and is intended to enable pilots or other personnel to become familiar with the launching apparatus and its method of use in a simple and safe manner on the ground. For this purpose the invention comprises a testing rig adapted to be set up on an aerodrome or in a hangar or other suitable building on which repeated tests or trials may be carried out either for testing the launching apparatus or for rendering pilots or others familiar with the apparatus and its manner of use so as to give them confidence in the effectiveness of the apparatus and to enable them to take full and quick advantage of the launching apparatus should the need for its use arise when in flight in an aircraft fitted with such apparatus. The invention is particularly intended for use in connection with the launching apparatus described in co-pending patent application Serial No. 638,762 filed January 3, 1946.

This invention comprises improvements in and additions to the testing apparatus described and claimed in the specification of co-pending patent application Serial No. 606,356 filed July 21, 1945, which comprises an apparatus for testing on the ground, personnel ejection seats intended for use in the launching of personnel from aircraft, the apparatus comprising upwardly directed guides, a supporting frame for such guides, a personnel seat slidably mounted in the guides, and a winding gear for lowering the seat; however it is necessary for the occupant of the seat to manually fasten the winding gear to the seat. The present invention has for its object to provide means for lowering the seat after each test and enables this to be done without the need for any action by the occupant of the seat and it further enables tests to be made without any human occupant in the seat. This invention also provides for the automatic support of the seat in the event of failure of the lowering apparatus or breakage of the supporting cable, thus providing an additional means of preventing an accident and ensuring the safety of those engaged in making or observing the trials.

According to this invention the testing rig is provided with a bogie mounted to slide in the guides on the testing rig and suspended therein by suitable winding gear adapted to raise and lower the bogie which is normally located near the top of the guides above the seat or other device which is impelled upwardly along the guides for testing or demonstration purposes.

2

The bogie is provided with a hook adapted to engage with a shackle on the seat or other device mounted on the testing rig and this shackle is interconnected with one or more sprags which engage with ratchet stops on the guides of the testing rig so that whilst the weight of the seat or other device is supported by the shackle, bogie and winding gear, the sprags will be withdrawn from engagement with the ratchet teeth to enable the seat to be lowered along the guides. If however the hook should become disengaged or the winding gear should fail, then the sprags would automatically engage with the ratchet teeth and will support the seat or other device so that it cannot fall or descend precipitately down the guides thus providing an automatic safety supporting means for the seat or other device.

A practical embodiment of the invention will now be described with reference to the attached drawings in which:

Fig. 3 is a front elevation of a bogie for slidably mounting in the guides of the testing rig shown in Figs. 1 and 2 and the shackle on the seat back for engagement therewith.

Fig. 4 is a part sectional side elevation on the centre line of Fig. 3.

Fig. 4A is a front elevation of the seat shackle.

Fig. 5 is a part sectional side elevation showing the sliding seat and the bogie mounted in the testing rig in the relative positions they will occupy just before the suspension hook on the bogie engages with the shackle on the back of the sliding seat.

Fig. 6 is an enlarged sectional detail of the upper and lower portions of Fig. 5 but showing the suspension hook engaged with the seat shackle.

Figure 1:
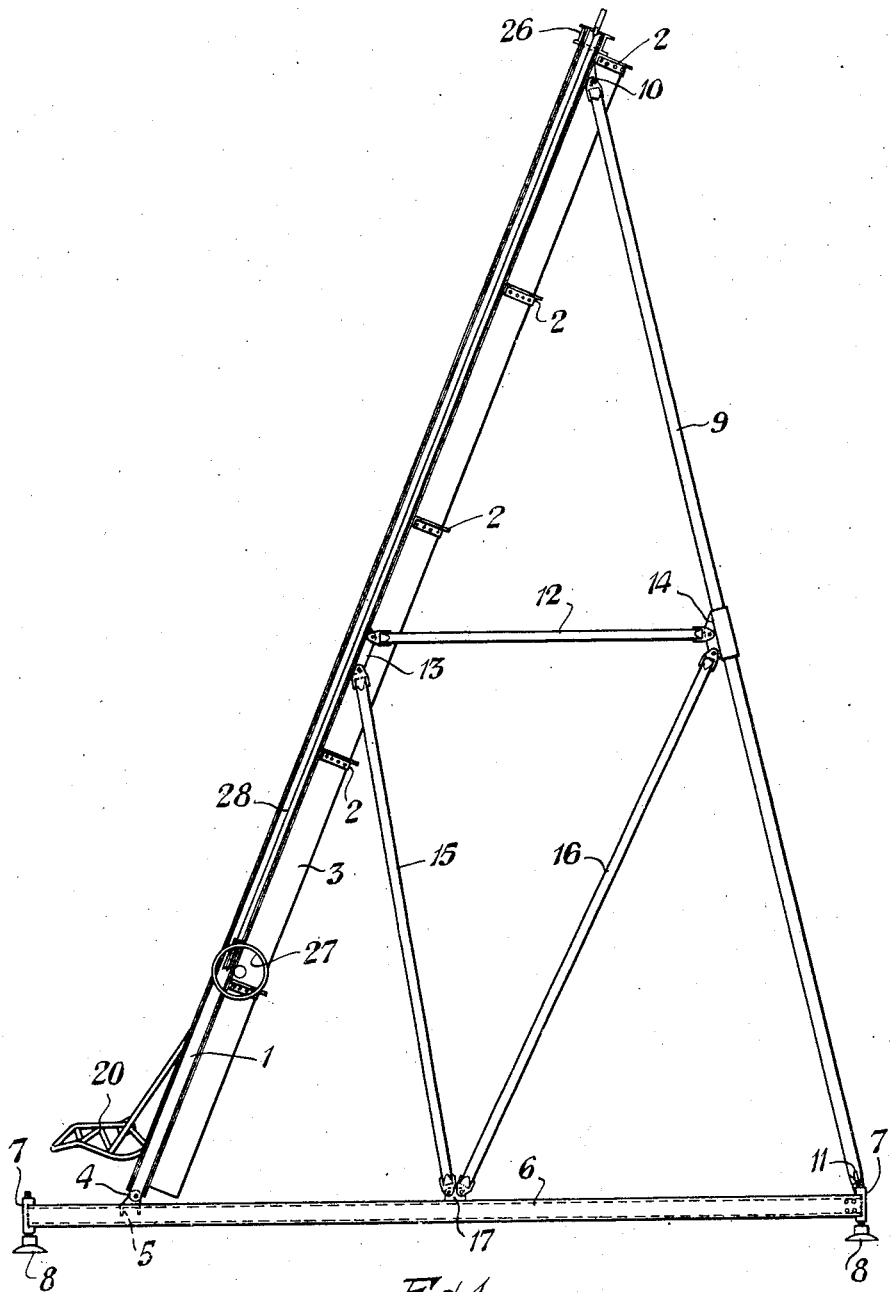
Fig. 1 is a side elevation of a suitable testing rig of a type to which the present invention may be applied.
Figure 2:
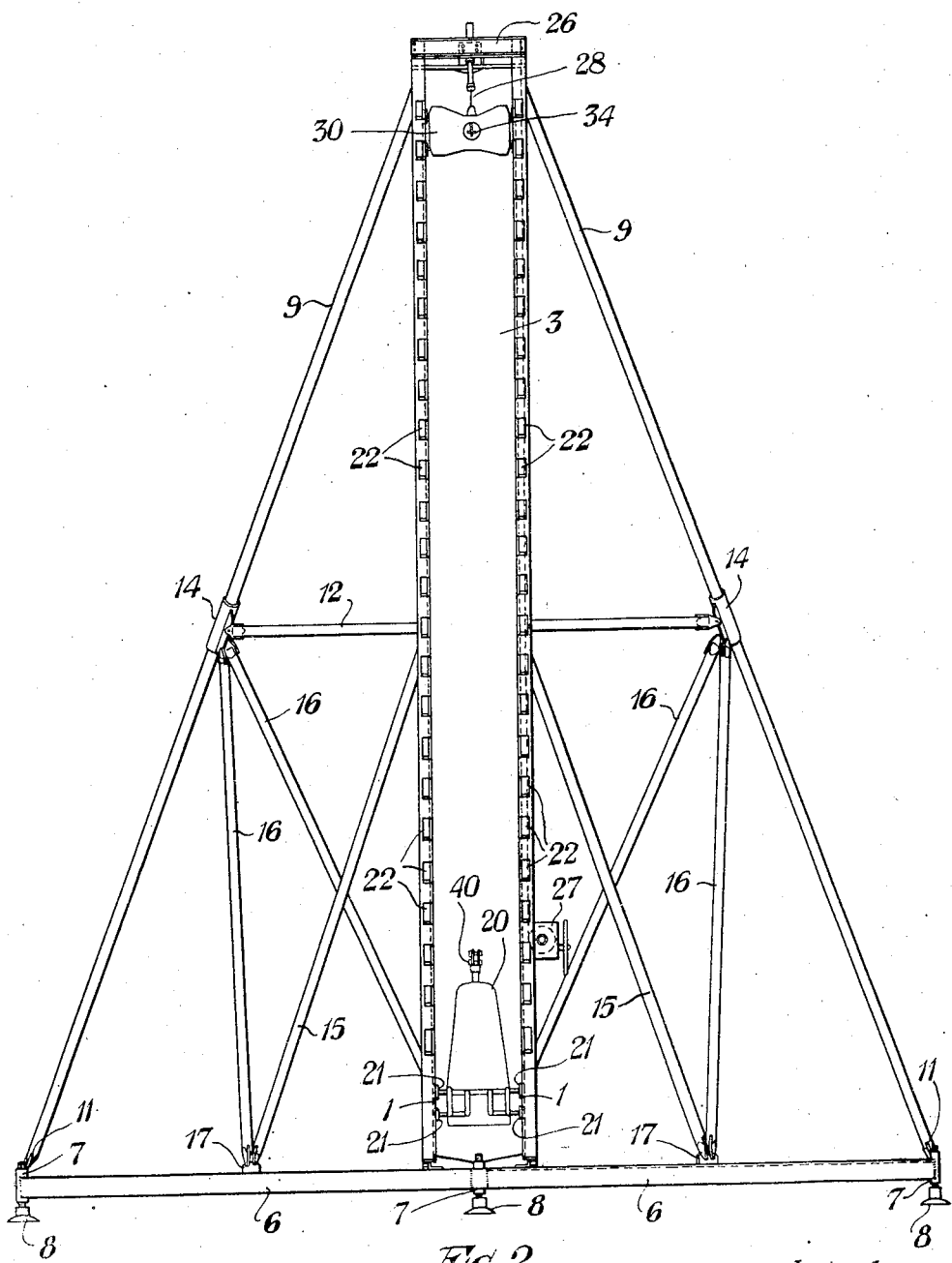
Fig. 2 is a front elevation of the testing rig shown in Fig. 1.
Figure 7:
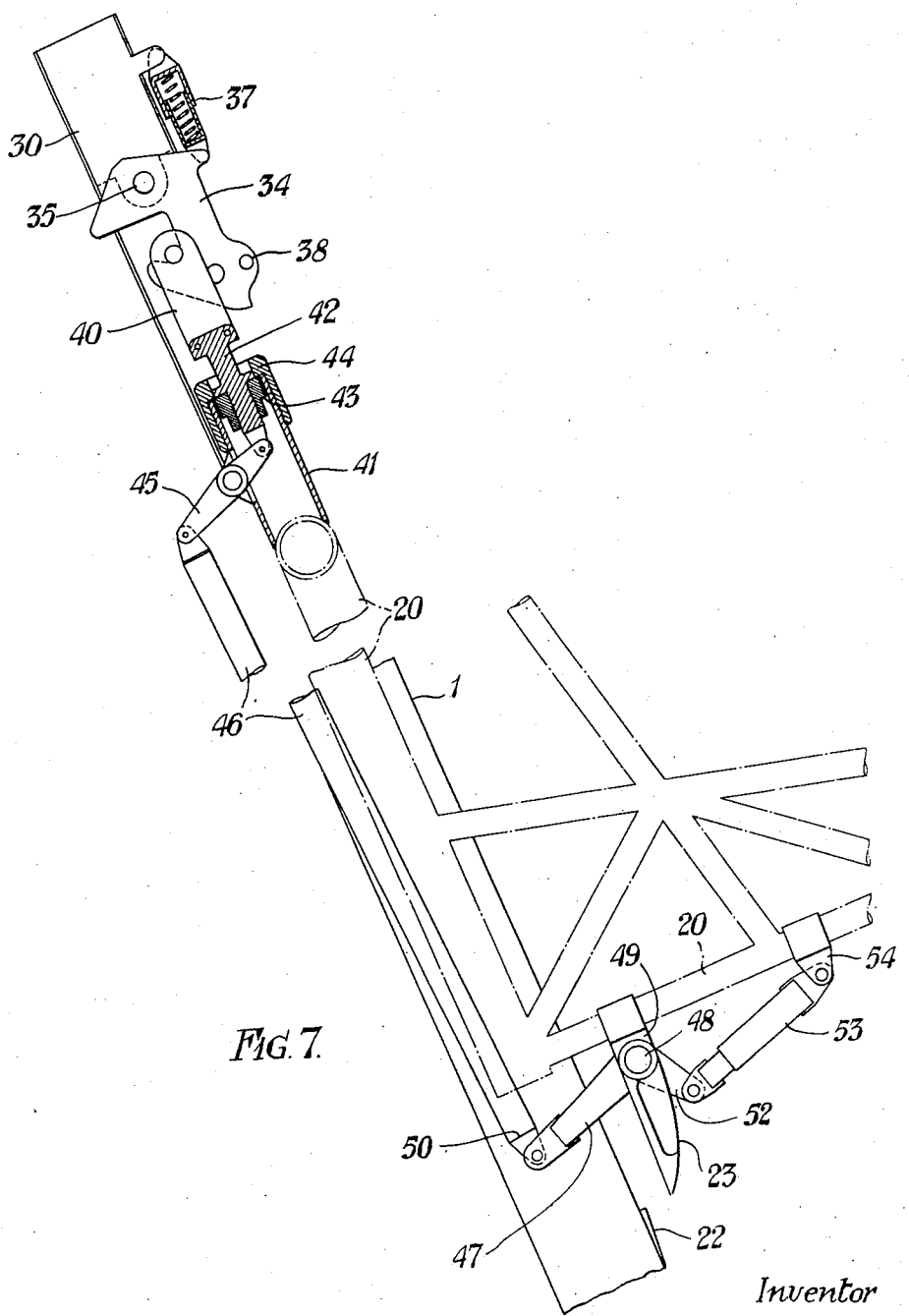
Fig. 7 is a similar view to Fig. 6 but shows the weight of the seat supported by the suspension hook of the bogie and the sprags on the seat disengaged from the ratchet teeth on the guides of the testing rig.

Referring to the drawings Figs. 1 and 2 illustrate the type of testing rig covered by co-pending patent application Serial No. 606,356 filed July 21st, 1945, and to which is applied the embodiment of the present invention which is described hereafter by way of example. As described in my co-pending application Serial No. 606,356 the testing rig comprises a pair of channel section guides 1 mounted parallel to each other and spaced apart a suitable distance by the transverse V-shaped connecting members 2 whose inner face is covered by panels 3 of sheet metal or other suitable material to form a recessed space between them. These parallel guides 1 are connected by pin joints 4 to the inverted channel cross-bar 5 extending across the front corner of the triangular base made of channel steel girders 6. At the junction of each two girders 6, that is at each corner of the triangular base, is provided an upright boss 7 in which is adjustably supported a pad 8 the base of which provides a substantial area to rest on the ground. The shank to each pad 8 may be screw threaded into its boss 7 so as to constitute a means of adjustment for levelling up the base frame 6. The upper ends of the guides 1 are supported by a pair of tubular struts 9 pin jointed to the guides 1 at 10 and extending downwardly and outwardly to pin joints 11 near the rear corners of the triangular frame 6. The triangulated structure is stiffened by means of tubular members 12 pin jointed to brackets 13 on the guides 1 and sleeves 14 on the struts 9. Further inclined tubes 15 and 16 are pin jointed at their upper ends to the brackets 13 and 14 and at their lower ends to brackets 17 on the base frame channels 6.

Figure 8:
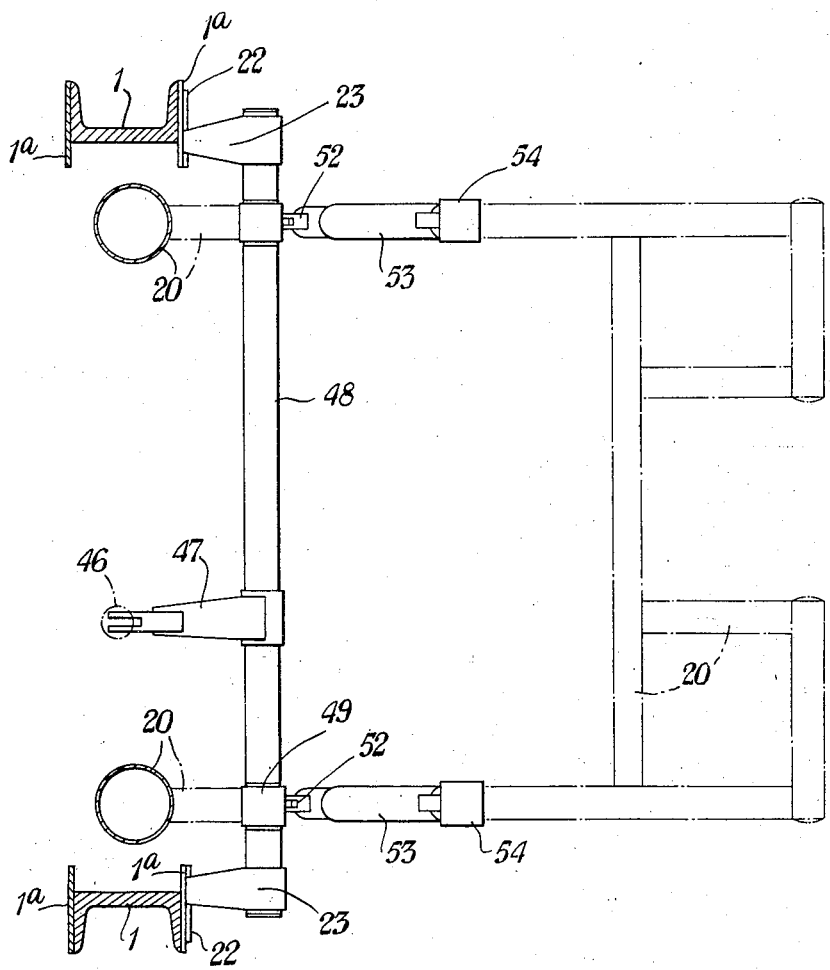
Fig. 8 is a cross section through the lower part of the sliding seat and the testing rig guides.

The present invention is intended for testing on the ground the launching gear intended for use in propelling a pilot and his seat from a high speed fighter type of aeroplane and the seat and propelling gear is represented diagrammatically at 20 in Figs. 1 and 5. Examples of a suitable launching gear are fully described in the specification and illustrated in the drawings of co-pending patent application Serial No. 638,762 filed January 3, 1946. The guides 1 are provided with front and rear facing strips 1a which overhang the inner edges of the guides 1 to form channels to receive the rollers 21 on the seat and launching gear 20, see Fig. 8. The front facing strip 1a is provided with a multiplicity of wedge shaped stops 22 arranged to form a ratchet face to the two guides 1 and spring actuated sprags 23 of the seat ride freely over the ratchet stops 22 when the seat is travelling upwardly along the guides but engage with the ratchet stops 22 to prevent the seat returning downwardly along the guides 1. The seat will thus be automatically supported at the highest point to which it is propelled by the launching apparatus. It is to be understood that in the present testing apparatus the seat is not actually ejected from the supporting guides but always remains captive within the limits of the guides, therefore, the present apparatus is merely for testing on the ground a seat which is intended for later use in an aircraft. Located above the seat 20 is the bogie 30 which also slides in the guides 1a, suitable rollers 31 thereon being provided to engage with the guides for this purpose. The bogie 30 is of approximately rectangular form consisting of a suitable metal casting or pressing or a hollow sheet metal structure with guide wheels 31 at each side to engage with the guides 1a of the testing rig. The bogie is suspended from the cable 28 of the winding gear 27 and this cable 28 passes round one or more pulleys supported by the cross-bar 26 near the top of the testing rig and extends downwardly to winding gear 27 located near the ground level and by which the bogie 30 may be lowered and raised along the guides of the testing rig. The end of the cable 28 is anchored to the bolt 32 in the bracket 33 of the bogie 30. The bogie 30 which is shown in greater detail in Figs. 3 and 4 is normally retained near the top of the testing rig guides. Supported in the bogie is a suspension hook 34 which is adapted to engage with a shackle 40 on the top of the back of the seat 20, slidably mounted in the testing rig guides. This suspension hook 34 is pivoted at 35 to the fitting 36 secured in the frame of the bogie 30 and is spring loaded by the enclosed spring 37 to act as a latch for automatic engagement with the seat shackle 40. The suspension hook 34 is provided with a cross-bar or finger piece 38 for manual manipulation through an opening 39 in the bogie frame.

The seat shackle 40 is mounted on the top of the seat back and is located in an upward extension 41 thereon. The shackle 40 is mounted to provide limited sliding movement between it and the tubular extension 41 of the seat back 20 by means of the shank 42 which is connected to a stop collar 43 slidable in the cap 44 on the extension 41. The shackle 40 is interconnected with the spring loaded sprags 23 so that when the weight of the seat is supported by the suspension hook 34 on the bogie 30 and the cable 28 and winding gear 27 then the spring loaded sprags 23 will be withdrawn from engagement with the ratchet stops 22 provided along the testing rig guides 1a. For this purpose, the lower end of the shank 42 of the shackle 40 is connected to the end of a lever 45 pivoted to the seat back extension 41 and the outer end of which is connected to the top of a push rod or tube 46, the lower end of which is connected to a lever 47 on a cross-tube or shaft 48 mounted in bearings 49 in the seat frame 20 and carrying the sprags 23, see Figs. 5, 6, 7 and 8. A portion 50 of the push rod or tube 46 is telescopic and is spring loaded by the spring 51 so that the initial relative movement of the shackle 40 in its mounting in the tubular extension 41 of the seat back 20 merely compresses the spring 51 in the telescopic portion 50 of the push rod or tube 46 so that when the seat has been slightly raised by operating the winding gear, its weight will no longer rest on the sprags 23 and the energy stored in the spring 51 compressed in the telescopic portion 50 of the push rod or tube 46, will turn the shaft 48 carrying the sprags 23 so as to disengage them from the ratchet teeth 22. The amount of telescopic movement between the parts of the push rod or tube 46 is limited by suitable stops. A pair of levers 52 on the cross-shaft 48 are each connected by enclosed springs 53 to brackets 54 on the seat frame 20 and normally act to keep the sprags 23 in engagement with the ratchet stops 22.

In operation the bogie 30 is normally retained near the top of the guides of the testing rig. The seat launching gear is brought into operation to impel the seat 20 upwardly along the guides 1 and when it has reached the top of its upward movement the sprags 23 will engage the ratchet stops 22 and retain the seat 20 against downward movement. This position is illustrated in Fig. 5. The winding gear 27 may now be operated from the ground to lower the bogie 30 along the testing rig guides until the suspension hook 34 snaps into engagement with the shackle 40 on the seat back 20. This disposition of the parts is illustrated in Fig. 6. The winding gear 27 is now operated to slightly raise the bogie 30 and with it the seat 20. As soon as the weight of the seat 20 is lifted from the sprags 23 the spring 51 compressed in the telescopic portion of the push rod or tube 46 will turn the sprags 23 away from and maintain them disengaged from the ratchet stops 22 and the bogie 30 and seat 20 may be lowered by operating the winding gear 27 in the required manner. This may all be accomplished without requiring any co-operation from the person in the seat or in fact without any person in the seat if desired. The arrangement also provides a safeguard against accident due to breakage of the cable or faulty operation of any part of the winding gear. When the weight of the seat and any occupant is not supported by the shackle 40 and cable 28, the spring 51 will extend the tube 46 to its maximum extent and the springs 51 will not affect the sprags 23 which will be firmly urged toward the ratchet stops 22.

I claim:

1. Apparatus for testing, on the ground, an ejection seat intended for use in launching personnel from aircraft comprising upwardly directed guides, a supporting frame for the upwardly directed guides, a bogie slidably mounted in said guides, a seat slidably mounted below said bogie and within said guides, winding gear for lowering and raising the bogie in the guides and means on the bogie for automatically engaging and connecting it to said seat.

2. A testing apparatus as recited in claim 1 in which the engaging and connecting means comprises a resiliently mounted suspension hook on said bogie and a shackle fixed to said seat, said hook engaging said shackle when the body is lowered into contact with said seat.

3. A testing apparatus as recited in claim 1 in which said guides are provided with ratchet stops and said seat is provided with sprags for engagement with said ratchet stops.

4. Apparatus for testing, on the ground, an ejection seat intended for use in launching personnel from aircraft comprising upwardly directed guides, a supporting frame for the upwardly directed guides, a bogie slidably mounted in said guides, a seat slidably mounted below said bogie and within said guides, winding gear for lowering and raising the bogie in the guides and ratchet stops on said guides, sprags on said seat for engagement with the ratchet stops, a suspension hook on said bogie, a shackle on the seat for engagement by the suspension hook on the bogie and automatically releasing means connecting the shackle with the sprags.

5. A testing apparatus as recited in claim 4 in which the automatic releasing means between the shacle and the sprags comprises a spring loaded telescopic connection between said shackle and said sprags.

JAMES MARTIN.

REFERENCES CITED

The following references are of record in the file of this patent:

UNITED STATES PATENTS

| Number | Name | Date |
|---|---|---|
| 290,297 | Weymouth | Dec. 18, 1883 |
| 659,197 | Allen | Oct. 2, 1900 |
| 1,321,780 | Anderson | Nov. 11, 1919 |
| 1,615,657 | Schwafel | Jan. 25, 1927 |
| 2,357,293 | Strong | Sept. 5, 1944 |
| 2,376,886 | Smith | May 29, 1945 |

FOREIGN PATENTS

| Number | Country | Date |
|---|---|---|
| 839,729 | France | 1939 |